US008904294B2

(12) United States Patent
Dinka et al.

(10) Patent No.: US 8,904,294 B2
(45) Date of Patent: Dec. 2, 2014

(54) SCREEN SHARING

(75) Inventors: David Dinka, London (GB); Dmytro Izotov, London (GB); Henrique Penha, London (GB)

(73) Assignee: Skype, Dublin (IE)

( * ) Notice: Subject to any disclaimer, the term of this patent is extended or adjusted under 35 U.S.C. 154(b) by 168 days.

(21) Appl. No.: 12/927,189

(22) Filed: Nov. 9, 2010

(65) Prior Publication Data

US 2011/0191695 A1   Aug. 4, 2011

(30) Foreign Application Priority Data

Feb. 3, 2010   (GB) .................................. 1001728.3

(51) Int. Cl.
| | |
|---|---|
| *G06F 3/00* | (2006.01) |
| *G06F 3/048* | (2013.01) |
| *G06F 3/14* | (2006.01) |
| *H04L 29/06* | (2006.01) |
| *G06F 3/0481* | (2013.01) |
| *G09G 5/14* | (2006.01) |

(52) U.S. Cl.
CPC ............ *G06F 3/0481* (2013.01); *G09G 5/14* (2013.01); *G09G 2358/00* (2013.01); *G06F 3/1454* (2013.01); *H04L 65/4023* (2013.01)
USPC .......................... 715/753; 715/748; 715/858

(58) Field of Classification Search
CPC ................................. G06F 3/048; G06F 3/00
USPC .......................................................... 715/753
See application file for complete search history.

(56) References Cited

U.S. PATENT DOCUMENTS

| 5,758,110 A * | 5/1998 | Boss et al. ..................... 715/751 |
| 7,451,181 B2 * | 11/2008 | Sasaki et al. .................. 709/204 |
| 2006/0053380 A1 * | 3/2006 | Spataro et al. ................ 715/753 |

(Continued)

FOREIGN PATENT DOCUMENTS

| EP | 1 215 568 A2 | 6/2002 |
| EP | 1215568 A2 * | 6/2002 |

OTHER PUBLICATIONS

Hereld, M., et al., "Collaboration as a Second Thought," *International Symposium on Collaborative Technologies and Systems*, CTS 2008, Piscataway, NJ, pp. 196-202, XP031273423, May 19, 2008.

(Continued)

*Primary Examiner* — Alvin Tan
*Assistant Examiner* — Xuyang Xia
(74) *Attorney, Agent, or Firm* — Sonia Cooper; Jim Ross; Micky Minhas (57) ABSTRACT

A method of transferring image data from a first terminal to a second terminal connected via a communication network, the method comprising: displaying on a screen of the first terminal a screen image generated by a processor executed application; a processor executing a communication client to: establish a communication event between the first and second terminals and display at the first terminal an interactive selection component; a user at the first terminal actuating the selection component to select at least one object displayed on the screen to be shared with the second terminal, wherein the communication client accesses data defining displayed object dimensions and adjusts the selection component based on those dimensions to cause the at least one object selected by the window selection component to be displayed on a screen of the second terminal by transferring image data over the communication network in the established communication event.

20 Claims, 10 Drawing Sheets

(56) References Cited

U.S. PATENT DOCUMENTS

2008/0183817 A1* 7/2008 Baek et al. .................. 709/204
2008/0307308 A1* 12/2008 Sullivan et al. .............. 715/723
2009/0235170 A1* 9/2009 Golden et al. ............... 715/719

OTHER PUBLICATIONS

Notification of Transmittal of the International Search Report and the Written Opinion of the International Searching Authority, or the Declaration, PCT/EP2011/051494, date of mailing: Mar. 29, 2011, pp. 13.

Techsmith: SnagIt Online Help Guide—Version 8.1, pp. 62-67 and 219-221, XP002474997, Aug. 23, 2006 [retrieved on Apr. 3, 2008]. Retrieved from the Internet URL: http://web.archive.org/web/20060823234443/http://download.techsmith.com/snagit/docs/onlinehelp/enu/snagit_help.pdf.

Techsmith: SnagIt User's Guide—Capture and Share Anything on Your Screen, pp. 4, 16-23, 25, 42 and 71, XP002354973, 2003 [retrieved on Nov. 18, 2005]. Retrieved from the Internet URL: ftp://ftp.techsmith.com/pub/products/snagit/63/snagitug.pdf.

* cited by examiner

SCREEN SHARING

RELATED APPLICATION

This application claims priority under 35 U.S.C. §119 or 365 to Great Britain Application No. 1001728.3, filed Feb. 3, 2010. The entire teachings of the above application are incorporated herein by reference.

FIELD OF THE INVENTION

The present invention relates to screen sharing in a computer system.

BACKGROUND

Communications systems allow users of devices to communicate across a computer network such as the internet. Communication events which can be established include voice calls, video calls, instant messaging, voice mail, file transfer and others. When one user is in communication with another user via a communication event, it is possible to share the contents of their screens. That is, a first user can decide to share the contents of his screen with a second user via the established communication event.

Packet-based communication systems allow the user of a device, such as a personal computer, to communicate across the computer network using a packet protocol such as Internet Protocol (IP). Packet-based communication systems can be used for various types of communication events. These systems are beneficial to the user as they are often of significantly lower cost than fixed line or mobile networks. This may particularly be the case for long-distance communication. To use a packet-based system, the user installs and executes client software on their device. The client software provides the packet-based connections as well as other functions such as registration and authentication.

At the moment, communication systems exist which permit screen sharing of any part of a screen image, as selected by a user, for example using a selection frame. In some cases, where a computer device runs a number of different applications, each of which may present a window to a user, that window can be shared with another user while the users are simultaneously connected via a communication event in that application. In order to share displayed content outside the application, it is necessary for both users to exit that application, enter a different application and then share the content in that different application. There also exist some associated applications, where it is possible to share content from one application while in another application, but these are limited and restricted to applications which are associated.

At present, when a user wishes to share a part of a screen image, he needs to manually manipulate, using a user interface tool such as a mouse, a selection component to select the correct part.

SUMMARY OF THE INVENTION

It is desirable to facilitate user selection of a portion of a screen to be shared with another user, particularly but not exclusively for packet based communication system.

According to an aspect of the present invention, there is provided a method of transferring image data from a first terminal to a second terminal connected via a communication network, the method comprising:

displaying on a screen of the first terminal a screen image generated by a processor executed application;

a processor executing a communication client to:
establish a communication event between the first and second terminals; and
display at the first terminal an interactive selection component;
a user at the first terminal actuating the selection component to select at least one object displayed on the screen to be shared with the second terminal,
wherein the communication client accesses data defining displayed object dimensions and adjusts the selection component based on those dimensions to cause the at least one object selected by the window selection component to be displayed on a screen of the second terminal by transferring image data over the communication network in the established communication event.

According to a further aspect of the invention, there is provided a user terminal comprising:

a screen operable to display a screen image generated by a processor executed application;
a processor executing a communication client to:
establish a communication event between the user terminal and a further terminal, and
to display on the screen an interactive selection component;
a user interface operable to permit a user at the user terminal to actuate the window selection component to select a portion of the screen image to be shared with a further terminal, wherein the communication client accesses data defining displayed object dimensions and adjusts the selection component based on those dimensions to cause the at least one object selected by the window selection component to be displayed on a screen of the second terminal by transferring image data over the communication network in the established communication event.

In the described embodiment, the data defining displayed object dimensions is stored in an operating system of the user terminal. The operating system can also hold data defining linked objects, whereby if an object which is selected is linked to a further object, the communication client adjusts the dimensions of the selection component to cause both objects to be shared.

BRIEF DESCRIPTION OF THE DRAWINGS

For a better understanding of the present invention and to show how the same may be carried into effect, reference will now be made by way of example to the accompanying drawings, in which.

DESCRIPTION OF THE PREFERRED EMBODIMENTS

Figure 1:
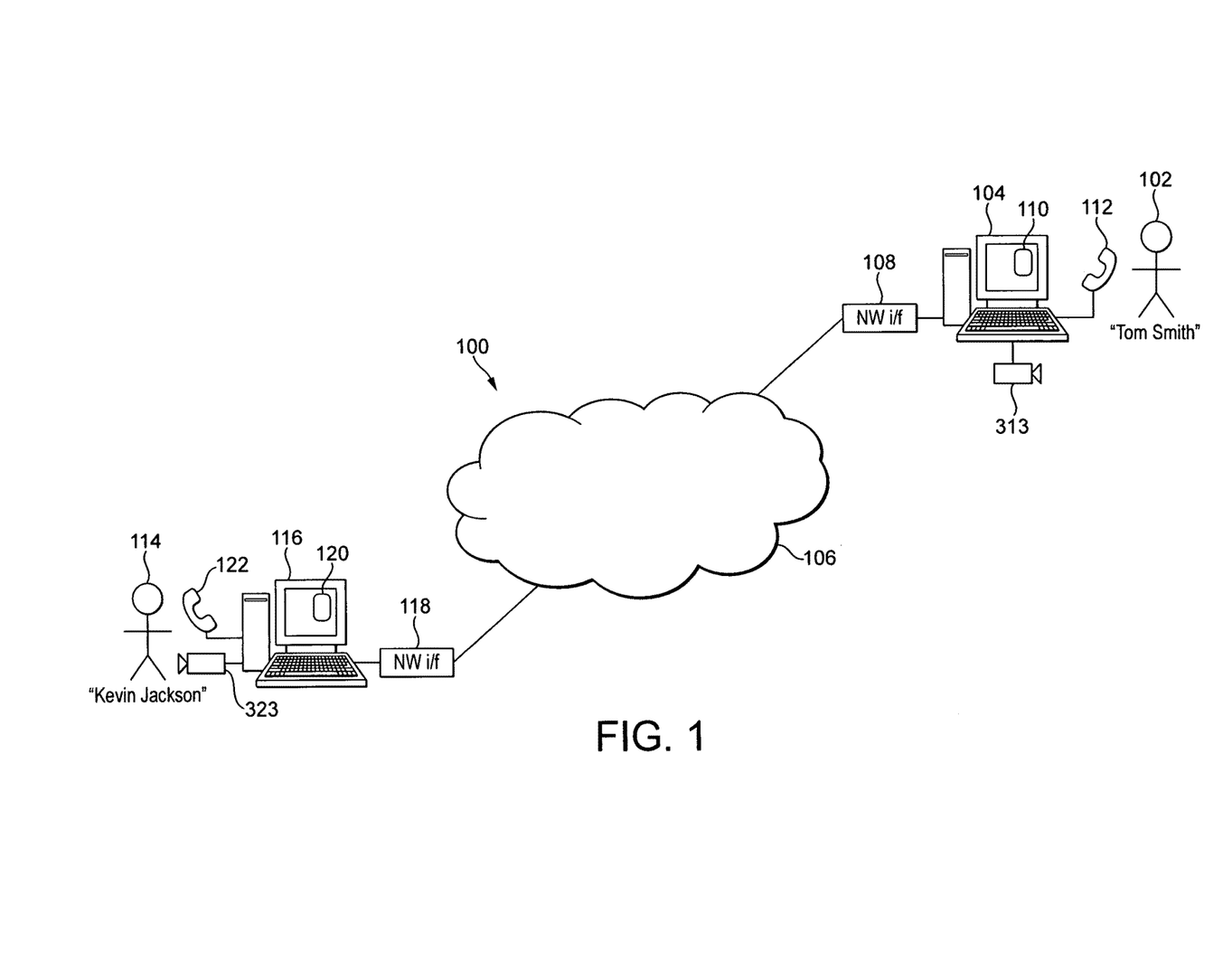
FIG. 1 is a schematic diagram of user terminals connected via a network.

Reference is first made to FIG. 1, which illustrates a P2P communication system 100. Note that whilst this illustrative embodiment is described with reference to a P2P communication system, other types of communication system could also be used, such as non-P2P communication systems. This type of packet-based communication system uses a peer-topeer ("P2P") topology built on proprietary protocols. To enable access to a peer-to-peer system, the user must execute P2P client software provided by a P2P software provider on their computer, and register with the P2P system. When the user registers with the P2P system the client software is provided with a digital certificate from a server. Once the client software has been provided with the certificate, communication can subsequently be set up and routed between users of the P2P system without the further use of a server. In particular, the users can establish their own communication routes through the P2P system based on the exchange of one or more digital certificates (or user identity certificates, "UIC"), which enable access to the P2P system. The exchange of the digital certificates between users provides proof of the users' identities and that they are suitably authorised and authenticated in the P2P system. Therefore, the presentation of digital certificates provides trust in the identity of the user. It is therefore a characteristic of peer-to-peer communication that the communication is not routed using a server but directly from end-user to end-user. Further details on such a P2P system are disclosed in WO 2005/009019.

A first user of the P2P communication system (named "Tom Smith" 102) operates a first user terminal 104, which is shown connected to a P2P network 106. Note that the P2P network 106 utilises a communication system such as the Internet. The user terminal 104 may be, for example, a personal computer ("PC"), personal digital assistant ("PDA"), a mobile phone, a gaming device or other embedded device able to connect to the P2P network 106. This user device is arranged to receive information from and output information to a user of the device. In a preferred embodiment of the invention the user device comprises a display such as a screen or monitor, and a user interface component such as a keyboard and/or mouse. The user device 104 is connected to the P2P network 106 via a network interface 108 such as a modem, and the connection between the user terminal 104 and the network interface 108 may be via a cable (wired) connection or a wireless connection.

The user terminal 104 is running a client 110, provided by the P2P software provider. The client 110 is a software program executed on a local processor in the user terminal 104. The user terminal 104 is also connected to a handset 112, which comprises a speaker and microphone to enable the user to listen and speak in a voice call. The microphone and speaker does not necessarily have to be in the form of a traditional telephone handset, but can be in the form of a headphone or earphone with an integrated microphone, or as a separate loudspeaker and microphone independently connected to the user terminal 104. The user terminal 104 can optionally be connected to a video camera 313 such as a web-cam. When connected to a video camera, the user device comprises a codec component which encodes video data for transmission. If there is no video camera, a separate codec component is provided for transferring image data.

The second user's terminal 116 may comprise similar elements, handset 122, client application 120, network interface 118, and an optional video camera 323 and associated codec component, or separate codec component. In this case, the codec component is for decoding video/image data.

Communication events, such as voice calls, video calls, IM or chat, may be initiated over the P2P system by selecting a contact from a displayed list of contacts and clicking on a "call" button using a pointing device such as a mouse. The call set-up is performed using proprietary protocols, and the route over the network 106 between the calling user and called user is determined by the peer-to-peer system without the use of servers. For example, the first user 102 can set up a communication event with the second user "Kevin Jackson" 114.

Following authentication through the presentation of digital certificates (to prove that the users are genuine subscribers of the P2P system—described in more detail in WO 2005/009019), the communication event can be made using packet based communications, e.g. using IP. The client 110 comprises a codec component 319 which performs the encoding and decoding of IP packets. IP packets from the user terminal 104 are transmitted into the network 106 via the network interface 108, and routed to a computer terminal 116 of the called party 114, via a network interface 118. A client 120 (similar to the client 110) running on the user terminal 116 of the called user 114 decodes the IP packets to produce an audio and/or video signal that can be heard and seen by the called user on their terminal 116. Conversely, when the second user 114 wants to transmit, the client 120 executed on user terminal 116 encodes the audio and/or video signals into IP packets and transmits them across the network 106 to the user terminal 104. The client 110 executed on user terminal 104 decodes the IP packets, and produces an audio and/or video signal that can be heard by the user of the handset 112 and/or seen on their display.

The IP packets for communicating events between P2P users (such as 102 and 114) as described above are passed across the network 106 only, and the PSTN network is not involved. Furthermore, due to the P2P nature of the system, connections between users of the P2P system can be established with no central servers being used.

Communication events can include voice and/or video calls. In addition to calls, the user of the client 110 can also communicate with users listed in a contact list in several other ways. For example, an instant message (also known as a chat message) can be sent by typing a message in a displayed box and sending it by selecting a "send message" button. Additionally, the first user 102 can use the client 110 to transmit files to users in the contact list or send voicemails to the contacts.

Figure 2:
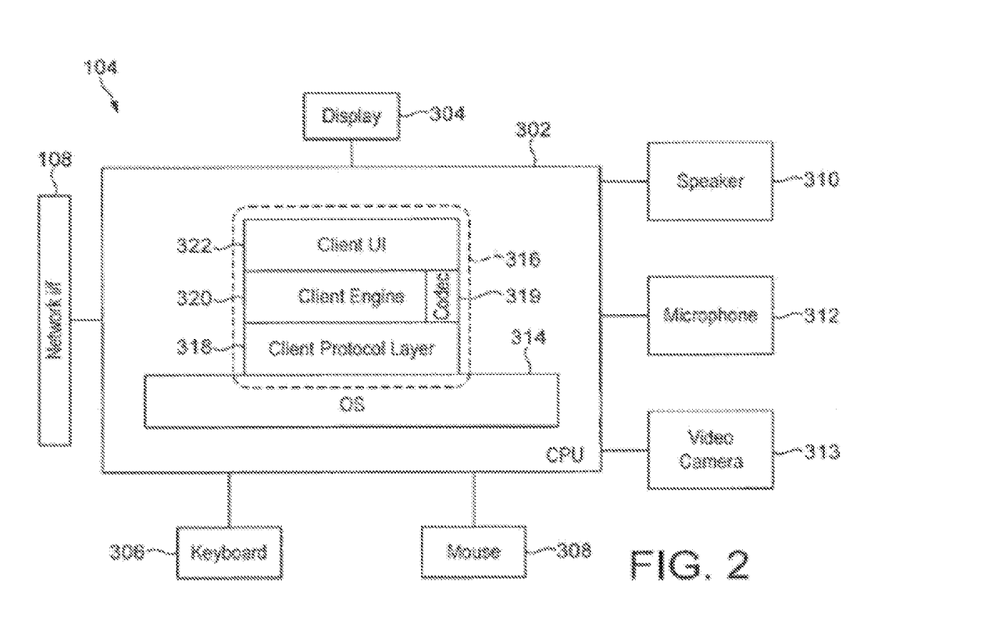
FIG. 2 is a schematic block diagram of a user terminal.

FIG. 2 illustrates a detailed view of the user terminal 104 on which is executed client 110. The user terminal 104 comprises a central processing unit ("CPU") 302, to which is connected a display 304 such as a screen, an input device such as a keyboard 306, a pointing device such as a mouse 308, a speaker 310, a microphone 312, and optionally a video camera 313. The speaker 310 and microphone 312 may be integrated into a handset 112 or headset, or may be separate. The CPU 302 is connected to a network interface 108 as shown in FIG. 1.

FIG. 2 also illustrates an operating system ("OS") 314 executed on the CPU 302. Running on top of the OS 314 is a software stack 316 for the client 110. The software stack shows a protocol layer 318, a client engine layer 320 (including the codec component 319 and a client user interface layer ("UI") 322. Each layer is responsible for specific functions. Because each layer usually communicates with two other layers, they are regarded as being arranged in a stack as shown in FIG. 2. The operating system 314 manages the hardware resources of the computer and handles data being transmitted to and from the network via the network interface 108. In addition the OS manages content to be displayed on the display 304, as will be discussed in more detail hereinafter. The client protocol layer 318 of the client software communicates with the operating system 314 and manages the connections over the P2P system. Processes requiring higher level processing are passed to the client engine layer 320. The client engine 320 also communicates with the client user interface layer 322. The client engine 320 may be arranged to control the client user interface layer 322 to present information to the user via the user interface of the client (as shown in FIG. 2) and to receive information from the user via the user interface. In FIG. 2, only one client stack is shown, but in most situations there will be more than one client stack on top of the operating system to deliver different applications to the user. For all applications running on the user terminal, the OS 314 stores a list of objects displayed by the different applications with their position and size. Each application can, through its client stack, access the list of objects currently being displayed on the screen, with the precise coordinates and sizes of those windows, from the OS. These objects include windows of context displayed by particular applications and items within those windows whose coordinates and size are also available from the OS. An object can be linked to an associated object, such linking being stored at the OS.

Figure 3A:
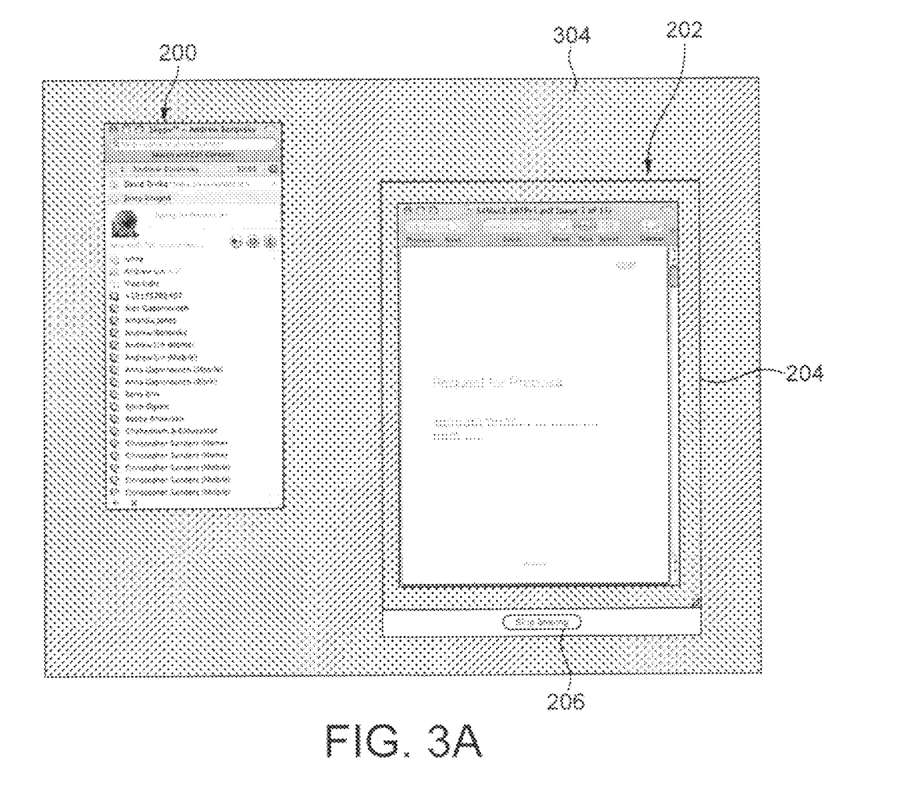
FIGS. 3A to 3D illustrate window selection using a frame.

FIG. 3A illustrates the display 304 presenting two display windows. The first display window 200 is launched by the communication client 110 and shows a contact list for users of the communications system. The second window 202 shows a document displayed for example by a word processing application running on top of the operating system 314. Reference numeral 204 denotes a sharing frame which, in accordance with embodiments of the invention, allows the first user 102 to share parts of his display with the second user 114. The frame is generated and managed by the communication client 110 using information provided by the OS.

Figure 3B:
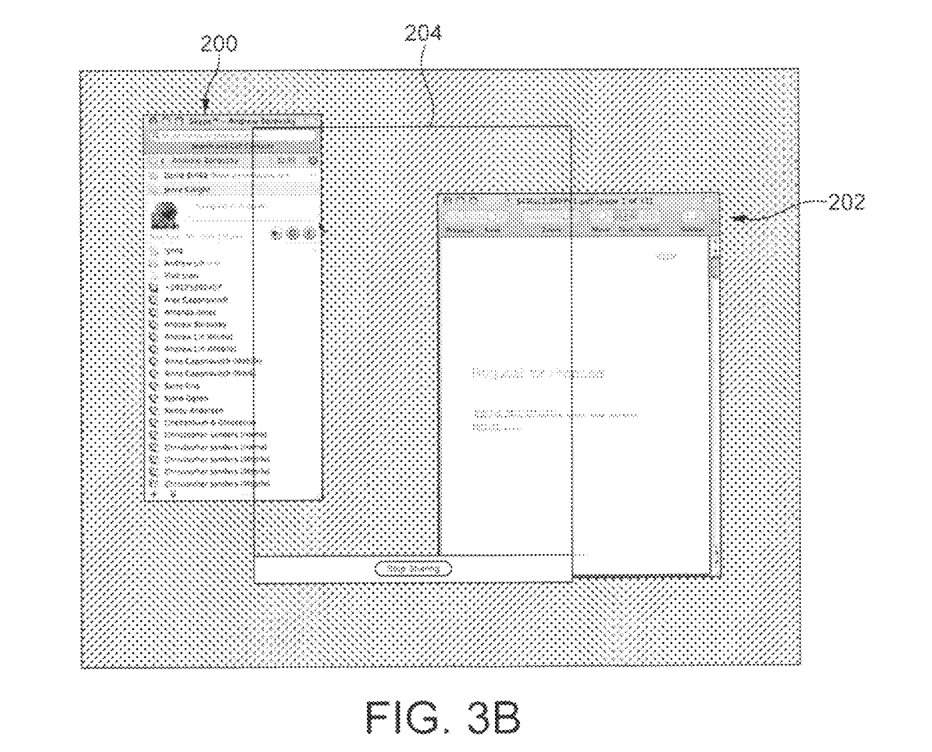
Figure 3C:
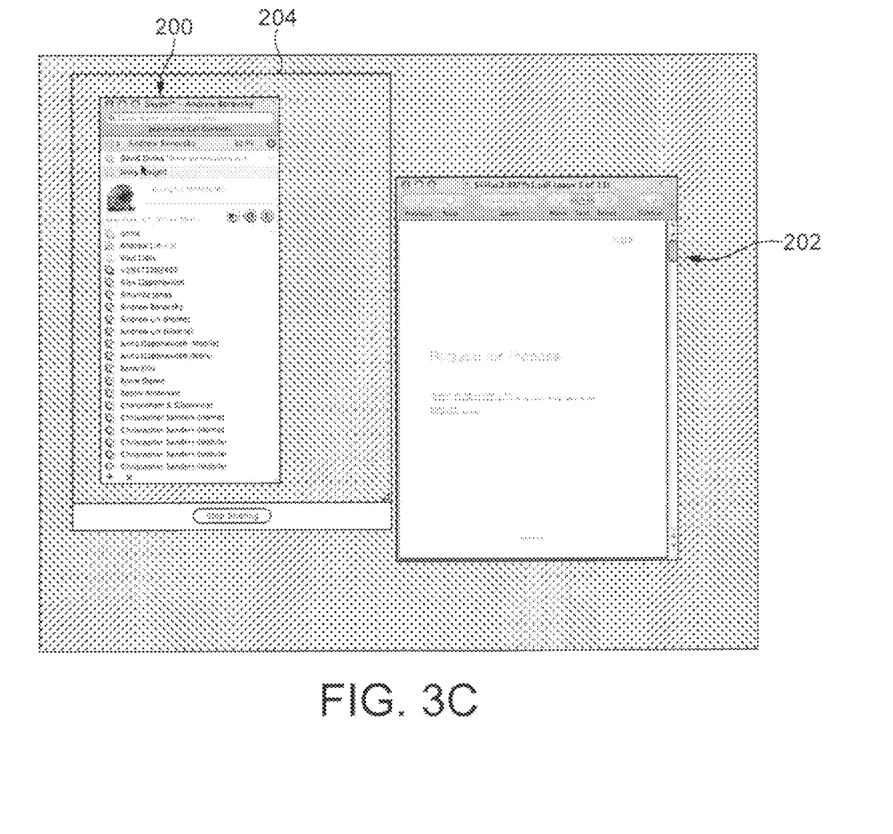
Figure 3D:
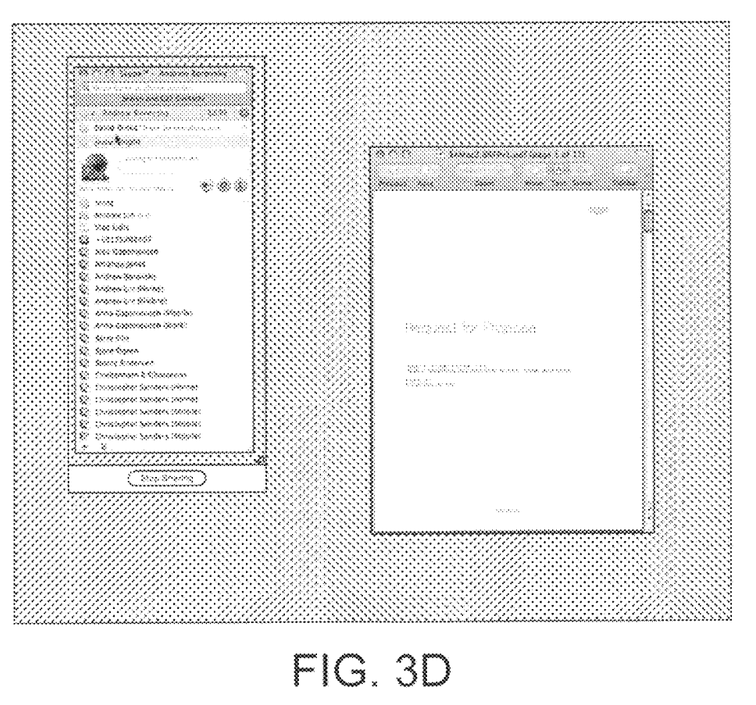

In this case, the display 304 is considered to be at the terminal 104 of the first user 102. This user 102 has control of the frame 204. The frame has a foot section which includes a sharing button 206 which will be discussed later. The location of the frame 204 can be managed by the user 102 through a user interface, typically a mouse. The mouse operates a cursor (not shown in FIG. 3A) by means of which the user 102 can drag the frame 204 across the display 304 until it is located over the first display window 200. This sequence is shown in FIGS. 3B to 3D. FIG. 3B illustrates the case where the frame is partway between the first window 202 and the second window 200. FIG. 3C illustrates the case where the frame is located over the first window 200, excluding the second window 202. In accordance with one embodiment of the invention, the location of the frame can be recognised as corresponding to a window 200 generated by a particular application. When the mouse is released, the frame adjusts in size automatically to the window generated by that application. This is referred to herein as "snapping" to the new window. The "snapped" frame is shown in FIG. 3D.

The "snapping" functionality is managed by cooperation between the communication client 110 which can access the list of windows currently showing on the screen and exact coordinates and sizes of those windows, and the OS which provides the list of windows and their position/size.

The "snapping" functionality operates at the level of objects managed by the operating system. That is, by locating the frame over an object, the location of the frame is detected and the boundary of the frame "snaps" to the size of that object. In the embodiment described above, the object is a window. However, the object could be an item within the window. Furthermore, if the frame is located by a user over two items which are assessed by the operating system as being linked objects, the frame will automatically "snap" over both objects such that both objects are shared with the second user 114.

The effect of the frame location will now be described. In FIG. 3A, assuming that the stop sharing button 206 had not been activated, the effect would have been to show on the display at the second user terminal 116 the document inside the second window 202 (and not the rest of the display). Looking now at FIG. 3D, when the frame has "snapped" to the first window, this has the effect of displaying at the first terminal 116 the contact list which was in the first window 200 (and no longer the document which was in the second window 202).

Figure 4:
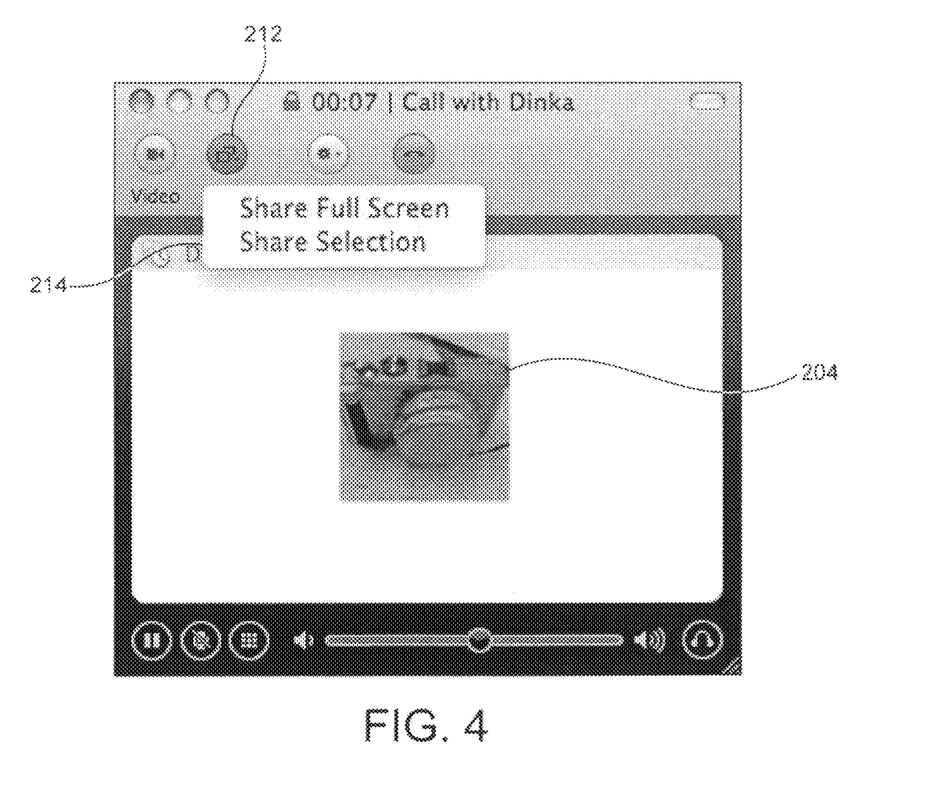
FIG. 4 illustrates a display for instigating screen sharing.

FIG. 4 illustrates how the option to share a selected part of the screen can be actuated. In order for the shared screen functionality to be implemented, a communication event needs to be established between users. In the case of FIG. 4, this is a call with a user named Dinka. A share button 212 is associated with a menu 214 which provides an option to share full screen or an option to share selection. When the share selection option is selected, the frame 204 appears around a part of the screen.

Figure 5A:
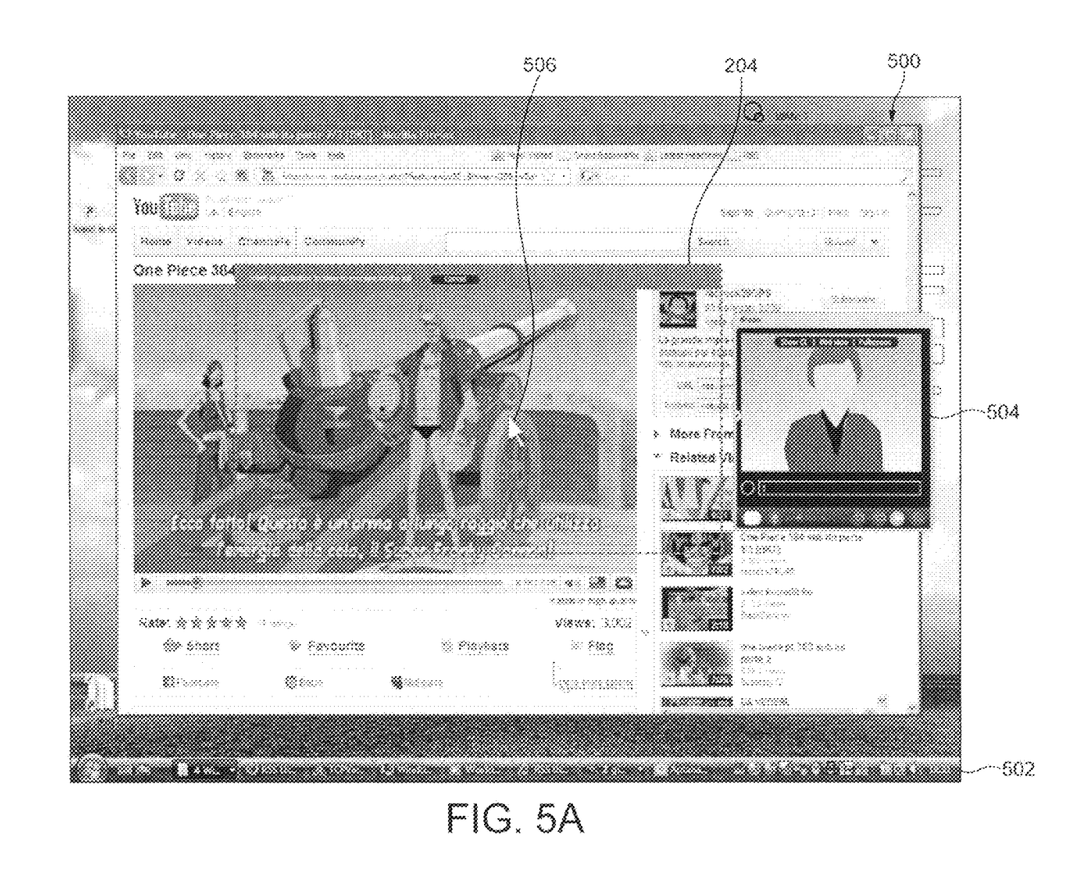
FIGS. 5A to 5C illustrate a second embodiment of partial screen sharing.
Figure 5B:
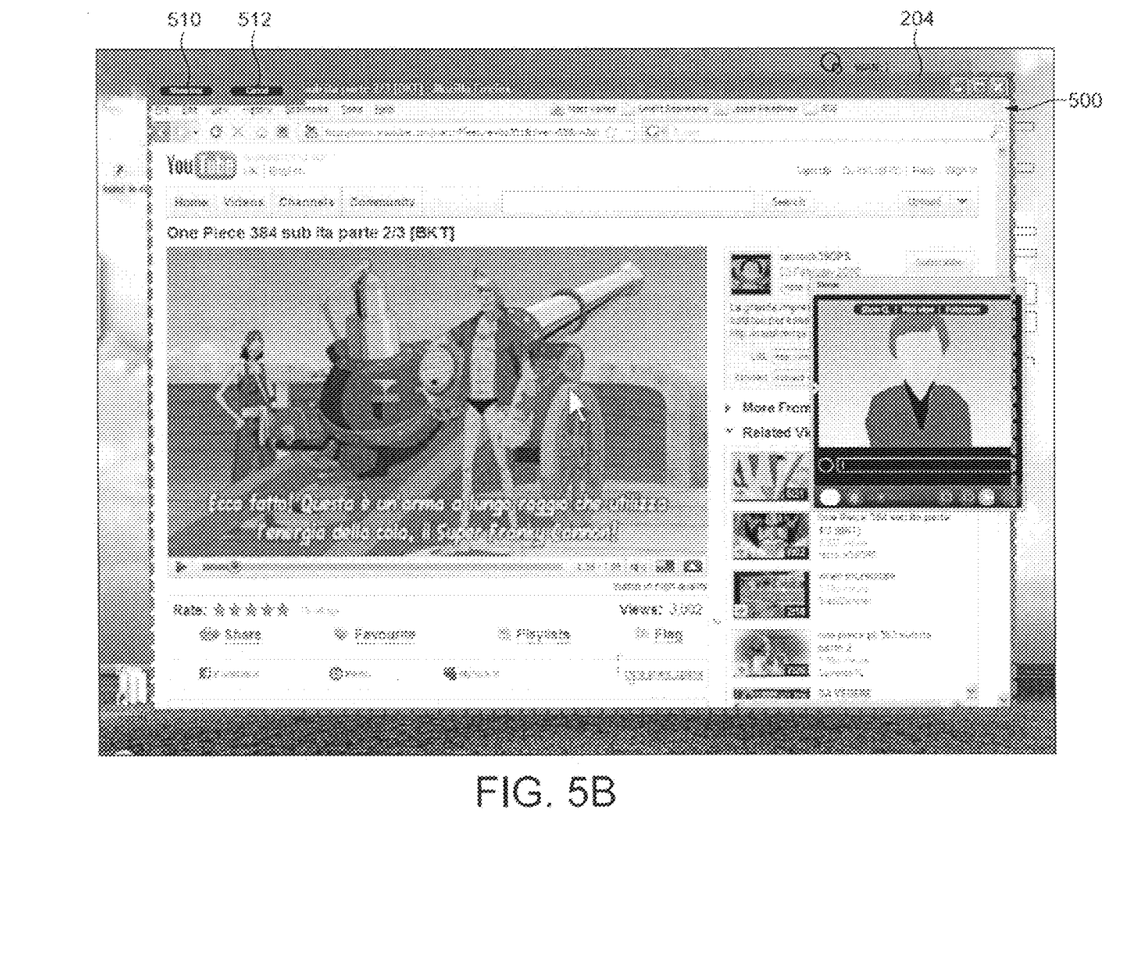
Figure 5C:
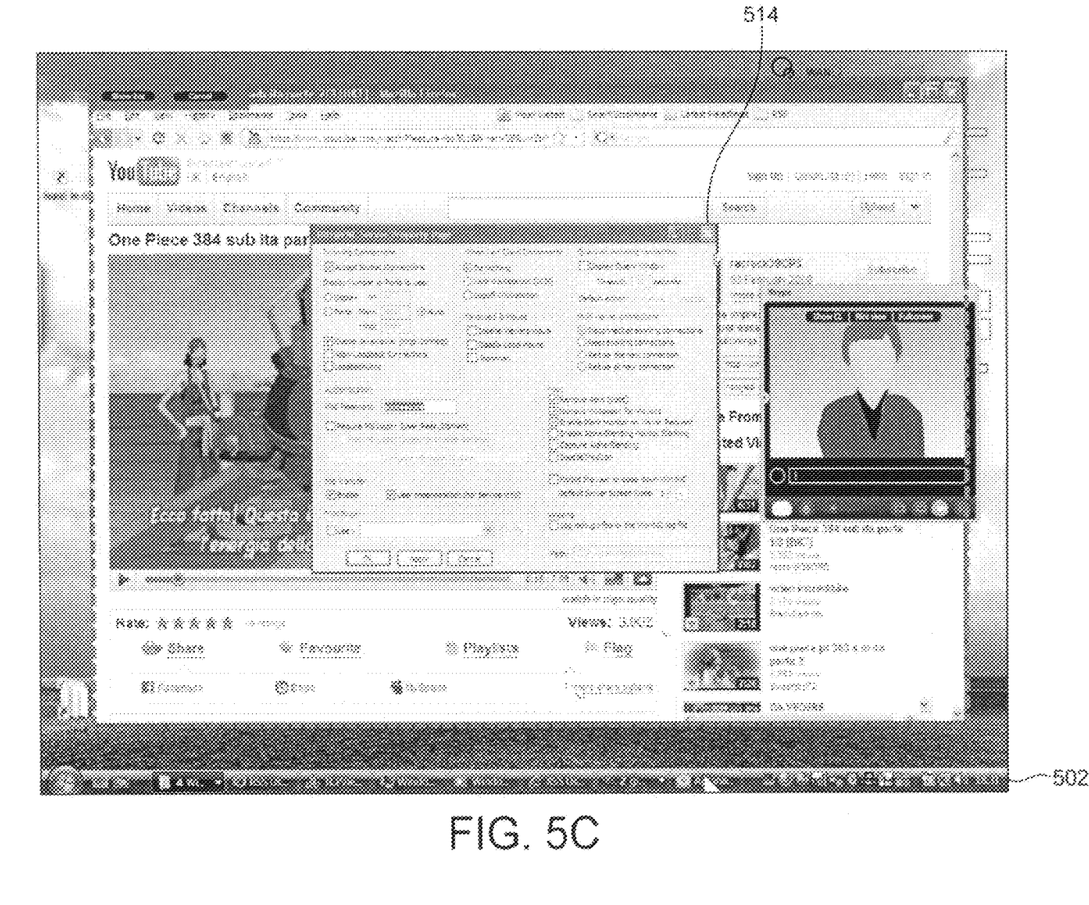

In accordance with a second embodiment, a window to share can be selected directly from a task bar. FIG. 5A illustrates a display which shows a window 500 open from a task bar 502. In this case the window is a You Tube item. The display 304 also displays a Skype client interface 504. The frame 204 is illustrated in dotted line in the centre of the display in FIG. 5A. By using the mouse to locate the cursor 506 in the centre of the window 500, and releasing it the user can select that window for sharing. This causes the frame 204 to automatically snap round the window 500 as shown in FIG. 5B. In the embodiment of FIGS. 5A and 5B, the frame has two sharing actuation buttons, a "show this" button 510 and a "cancel" button 512. If the "show this" button 510 is activated, this has the effect of sharing the contents of the window 500 with a second user connected to the first user by the communication event. The sharing can be cancelled by actuation of the "cancel" button 512. While in this situation, the user can choose to share a different application or a different window by selecting that window from the task bar 502. As illustrated in FIG. 5C, in this case he chooses to select a server property page 514. Once again, if he locates the cursor using the mouse in the centre of that page 514, and releases the mouse the frame 204 will automatically "snap" to the window 514 and select it for sharing.

In the described embodiments of the invention, the window selection frame 204 is available regardless of whether or not sharing is active. If screen sharing is active, and a new object is selected, the frame remains such that the newly selected object can be shared. Furthermore, it is possible to provide that the frame can be resizable by a user at any time, in addition to its facility to snap onto selected objects.

The contents of the selected window are shared by using the communication channel established for the communication event. That is, the screen data is converted into IP packets by the codec component and conveyed to the user with which the screen contents are to be shared, in a manner which is known per se.

The invention claimed is:

1. A method comprising:
   causing to be displayed at a first terminal an interactive selection frame at a first size;
   detecting a movement of the interactive selection frame, at the first terminal, to overlap a portion of at least one object displayed at the first terminal;
   responsive to said detecting:
      accessing data defining dimensions and display position of the at least one object; and
      automatically adjusting at the first terminal a size and display position of the interactive selection frame based on the dimensions and the display position of the at least one object by snapping the interactive selection frame to a second size different than the first size such that the interactive selection frame encompasses the at least one object and does not encompass objects displayed at the first terminal that are not overlapped by the movement of the interactive selection frame, the automatically adjusting being independent of a resizing at a second terminal;

receiving a selection of a share control that is displayed as part of the interactive selection frame, the share control being selectable to turn on and off sharing of objects within the interactive selection frame, and the interactive selection frame being visible at the first terminal when sharing is turned on and when sharing is turned off; and causing, responsive to receiving the selection of the share control, the at least one object to be displayable on a screen of the second terminal by transferring image data corresponding to the at least one object to the second terminal.

2. A method according to claim 1, wherein a boundary of the interactive selection frame is automatically sized to fit a boundary of the at least one object.

3. A method according to claim 1, wherein the at least one object is generated by an application that is independent of a communication client that manages the interactive selection frame.

4. A method according to claim 1, wherein the at least one object comprises a window generated by a first processor executed application, and where the at least one object is displayed as part of a larger screen image generated by at least one further processor executed application.

5. A method according to claim 1, wherein the interactive selection frame is user sizable.

6. A method according to claim 1, wherein the at least one object comprises a window selected from a task bar.

7. A method according to claim 6, wherein the interactive selection frame is actuated by a user selecting the window generated from the task bar.

8. A method according to claim 1, wherein the movement of the interactive selection frame causes the interactive selection frame to overlap a further object, and wherein a communication client that manages the interactive selection frame adjusts the size of the interactive selection frame to cause the at least one object and the further object to be shared.

9. A method according to claim 1, wherein the image data is encoded prior to transfer.

10. A memory, implemented in hardware, storing a computer program product comprising computer program code which is executable by a processor to carry out steps comprising:

establishing a communication event between a first terminal and a second terminal in a communication network;

displaying at the first terminal an interactive selection frame at a first size and a share control as part of the interactive selection frame, the share control being selectable to toggle sharing functionality of the interactive selection frame;

detecting that the interactive selection frame is moved at the first terminal to visually overlap a portion of at least one object displayed at the first terminal; and responsive to said detecting;

accessing data defining a display position and dimensions of the at least one object;

automatically adjusting, independent of a resizing at the second terminal, a size and display position of the interactive selection frame at the first terminal, based on the display position and the dimensions of the at least one object, by snapping the interactive selection frame to a second size different than the first size such that the interactive selection frame encompasses the at least one object and does not encompass objects displayed at the first terminal that are not overlapped by movement of the interactive selection frame; and causing the at least one object to be displayable on a screen of the second terminal by transferring image data of the at least one object over the communication network in the established communication event.

11. The memory of claim 10, wherein said displaying further comprises displaying a different share control that is selectable during the established communication event to toggle between sharing a full screen image of the first terminal with the second terminal, or sharing with the second terminal only portions of a screen of the first terminal that are selected via the selection frame.

12. The memory of claim 10, further storing information relating to linked objects, such that if the at least one object is linked to a further object, the computer program code is further executable to adjust the size and display position of the interactive selection frame to cause the at least one object and the further object to be shared with the second terminal.

13. A user terminal comprising:

a screen configured to display a screen image;

a communication client configured to perform operations including:

establishing a communication event between the user terminal and a second user terminal; and displaying, on the screen, an interactive selection frame at a first size and a share control as part of the interactive selection frame, the share control being selectable to toggle sharing functionality of the interactive selection frame;

a user interface managed by the communication client and configured to permit a user at the user terminal to actuate the interactive selection frame to select a portion of the screen image to be shared with the second terminal, the communication client being further configured to perform operations including:

detecting that the interactive selection component is moved to overlap a portion of at least one object displayed on the portion of the screen image; and responsive to said detecting:

accessing data defining a display position and dimensions of the at least one object;

automatically adjusting, independent of a resizing at the second terminal, a size and display position of the interactive selection frame at the user terminal, based on the display position and the dimensions of the at least one object, by snapping the interactive selection frame to a second size different than the first size, such that the interactive selection frame encompasses the at least one object and does not encompass objects displayed at the user terminal that are not overlapped by movement of the interactive selection frame; and causing the at least one object to be displayable on a screen of the second terminal by transferring image data of the at least one object over the communication network in the established communication event.

14. A user terminal according to claim 13, wherein responsive to said detecting, the communication client automatically adjusts a boundary of the frame to fit a boundary of the at least one object.

15. A user terminal according to claim 13, wherein the at least one object is generated by an application that is independent of the communication client.

16. A user terminal according to claim 13, wherein the at least one object comprises a window generated by a first processor executed application and wherein the screen image comprises at least one further window generated by at least one further processor executed application.

17. A user terminal according to claim 13, wherein the user interface is configured to allow the interactive selection frame to be user sizable.

18. A user terminal according to claim 13, further comprising an encoder for encoding the image data prior to transfer.

19. A user terminal according to claim 13, further comprising an operating system which maintains the data defining the display position and dimensions of the at least one object.

20. A user terminal according to claim 19, wherein the operating system further stores information relating to linked objects, such that if the at least one object is linked to a further object, the communication client adjusts the size and display position of the interactive selection frame to cause the at least one object and the further object to be shared with the further terminal.

* * * * *